C. A. STICKNEY.
FRICTION CLUTCH MECHANISM.
APPLICATION FILED NOV. 12, 1915.

1,209,351.

Patented Dec. 19, 1916.
2 SHEETS—SHEET 1.

Section "AA".

Inventor:
Charles A. Stickney,
by: C. P. Enochs
Attorney

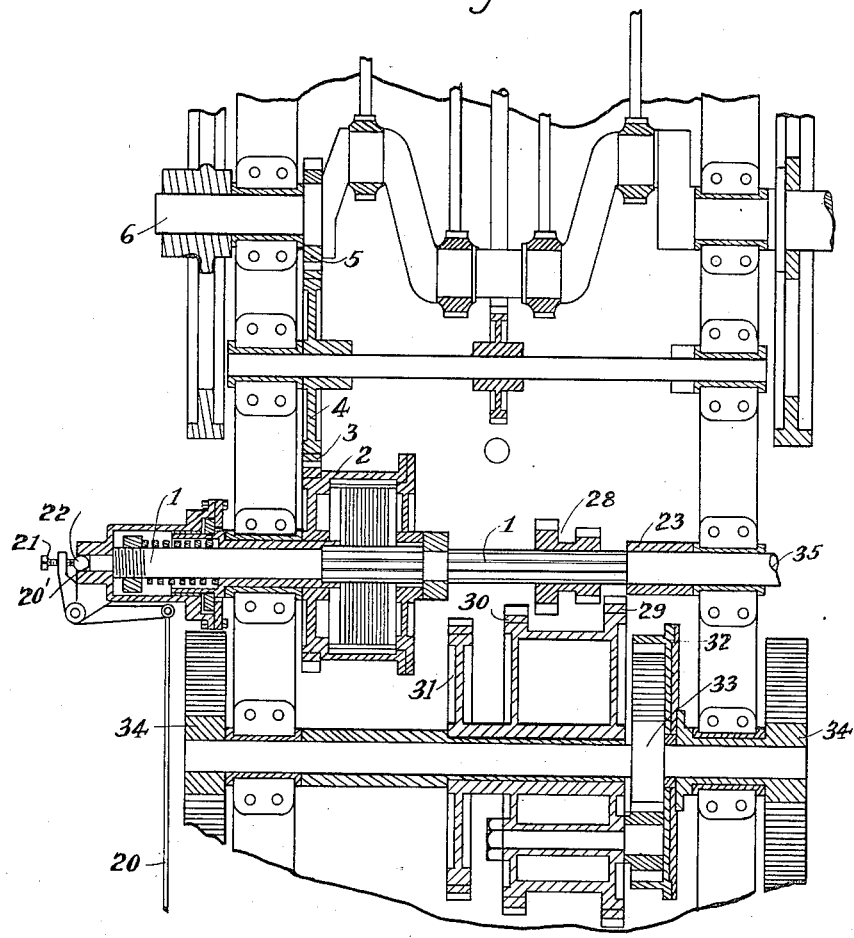

UNITED STATES PATENT OFFICE.

CHARLES A. STICKNEY, OF CHICAGO, ILLINOIS.

FRICTION-CLUTCH MECHANISM.

1,209,351.   Specification of Letters Patent.   Patented Dec. 19, 1916.

Application filed November 12, 1915. Serial No. 61,176.

*To all whom it may concern:*

Be it known that I, CHARLES A. STICKNEY, a citizen of the United States, residing at Chicago, county of Cook, State of Illinois, have invented new and useful Improvements in Friction-Clutch Mechanism, of which the following is a specification.

Figure 1:
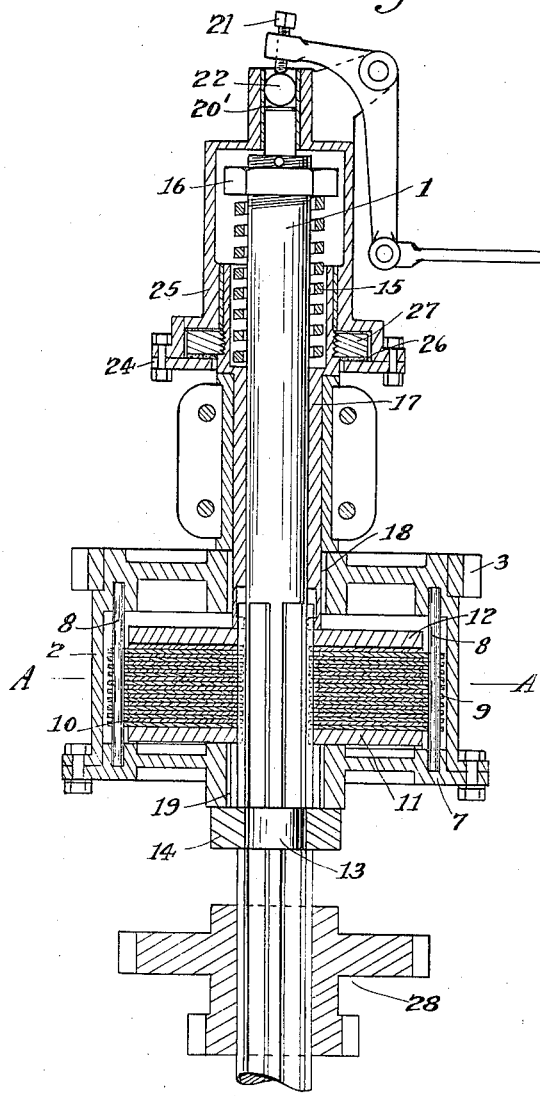
Figure 2:
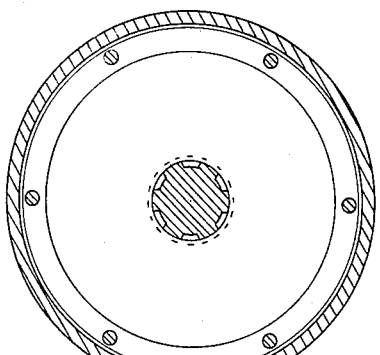

The drawings which form a part of this specification disclose in Figure 1 a cross section of a friction clutch embodying my invention, the section being taken on the axis of the transmission shaft 1, Fig. 2 being a cross section taken on the line A A, and Fig. 3 showing the friction clutch as applied to a tractor.

The friction clutch drum 2, Fig. 3, has shrunk thereon or otherwise suitably attached, a spur gear 3 adapted to be driven by the spur gear 4, which in turn is driven by the pinion 5, securely fastened to the crank shaft 6 of the engine to which the friction clutch is applied.

The drum 2 has bolted to the open end thereof a drum head 7, Fig. 1, and thus drives through the pins 8 the outside friction disks 9, which have a central opening clearing the splined portion of the transmission shaft 1. The inside friction plates 10 have a central aperture fitting the splined shaft 1 so that when engaged with the outside friction disks they serve to drive the transmission shaft 1.

End friction plates 11 and 12 are provided for pressing the inside and outside friction plates together so as to give a sufficient friction between the plates to drive the transmission shaft 1 under the load it is adapted to carry.

The splined transmission shaft 1 is turned down to a smaller diameter at 13 and has mounted thereon a split collar 14 which serves to take the thrust of the drum head 7.

A spring 15 of suitable strength adjustable by the nut 16 is adapted to thrust the friction thrust sleeve 17 against the end friction plate 12 and thus engage the disks when properly actuated, the pressure being exerted between the split collar 14 and the nut 16.

The friction clutch drum is provided with a suitable bearing on the friction thrust sleeve at 18 and on the transmission shaft sleeve 19 to eliminate wear when the clutch is released and the engine running.

To disengage the clutch the rod 20, Fig. 3, is pulled backward by a suitable lever (not shown) the adjusting set screw 21 thus pushing on the end 20′ of the transmission shaft through the medium of the ball 22, and as the shaft is prevented from moving by the spacing collar 23, Fig. 3, the friction clutch releasing plate 24, Fig. 1, which is bolted to the clutch releasing case 25, is moved outwardly with respect to the transmission shaft and through the fiber washer 26 and the friction thrust sleeve collar 27 which is screwed to the friction clutch sleeve 17 carries with it in its outward motion the friction clutch sleeve 17, compressing the spring 15 and releasing the pressure on the end friction plate 12, and hence the friction between the outside and inside disks.

The fiber washer 26 bearing upon the friction thrust sleeve collar 27 and the nonrotatable releasing case 25 will stop the rotation of the friction thrust sleeve and hence of the shaft 1 as soon as the clutch is disengaged so the gears may be quickly shifted.

The two diameter sliding gear 28 is splined to the transmission shaft 1, Fig. 3, and is adapted to be engaged with either the gear 29 or 30, or through an idler gear (not shown) with the gear 31 in a reverse direction, thus driving the housing 32 of the differential gear 33 so the power taken from the crank shaft 6 may be applied to the bull pinions 34 for driving the tractor forward or backward.

The transmission shaft 1, which is shown broken off at 35, is adapted to carry at that point a power pulley so the power taken from the crank 6 may be transmitted through the friction clutch to the power pulley 35 with the machine standing still, the sliding gear 28 being in the neutral position.

The friction clutch drum 2 with the drum head 7 is preferably oil tight and the friction disks may thus be run in a bath of oil so there will be no appreciable wear on the disks themselves, and the drive being made through oil friction the clutch can be made to take hold gently without appreciably wearing down the plates.

While I have described my invention as embodied in one particular design and illustrated it in one construction, I do not wish it understood that I limit myself to this construction, as it is evident that my invention may be varied within the scope of the following claims.

Claims:

1. In a friction clutch the combination of a shaft, a friction disk adapted to drive said shaft, a thrust sleeve, a drum journaled on said thrust sleeve and carrying a friction disk, a spring coacting with said sleeve and said shaft, means for preventing the lateral movement of said shaft, a releasing case journaled on said thrust sleeve, a releasing collar rigidly attached to said thrust sleeve but adapted to revolve in said releasing case, an opening in one end of said releasing case adapted to serve as a bearing for one end of said shaft, a thrust member impinging on said end of said shaft and pivotally mounted on said releasing case, a shoulder in said thrust sleeve, a spring encircling said shaft, a nut on said shaft retaining said spring between said nut and said shoulder on said thrust sleeve, and means for actuating said thrust member whereby said releasing case and said thrust sleeve may be moved reciprocally with said shaft.

2. In a friction clutch the combination of a shaft, a friction disk adapted to drive said shaft, a thrust sleeve slidable on said shaft, a drum journaled on said thrust sleeve, a friction disk adapted to be driven by said drum, means for engaging said disks, a non-rotatable case surrounding said thrust sleeve, a collar fixed on said thrust sleeve and a frictional collar associated with said case adapted to be engaged with said case and said collar fixed on said thrust sleeve when said disks are disengaged for the purpose of stopping the rotation of said shaft.

CHARLES A. STICKNEY.